(No Model.)

R. W. TINSLEY.
COUPLING FOR PNEUMATIC CAR BRAKES.

No. 486,001.　　　　　　　　　Patented Nov. 8, 1892.

WITNESSES:
Fred G. Dieterich
Ann W. Hart

INVENTOR:
Rufus W. Tinsley
BY
ATTORNEYS

UNITED STATES PATENT OFFICE.

RUFUS W. TINSLEY, OF UNION, SOUTH CAROLINA.

COUPLING FOR PNEUMATIC CAR-BRAKES.

SPECIFICATION forming part of Letters Patent No. 486,001, dated November 8, 1892.

Application filed January 13, 1892. Serial No. 417,996. (No model.)

*To all whom it may concern:*

Be it known that I, RUFUS W. TINSLEY, a citizen of the United States, residing at Union, in the county of Union and State of South Carolina, have invented an Improved Coupling for Pneumatic Car-Brakes, of which the following is a specification.

My invention is an improvement in the class of couplings for the air-pipes of car-brake systems which are adapted to engage and disengage automatically.

I have devised certain novel constructions and combinations of parts, as hereinafter set forth.

Figure 1:
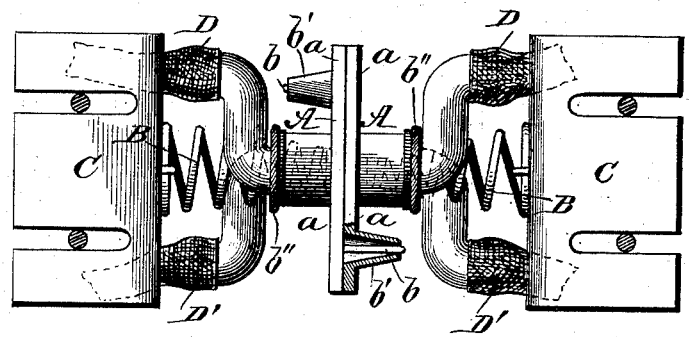
Figure 2:
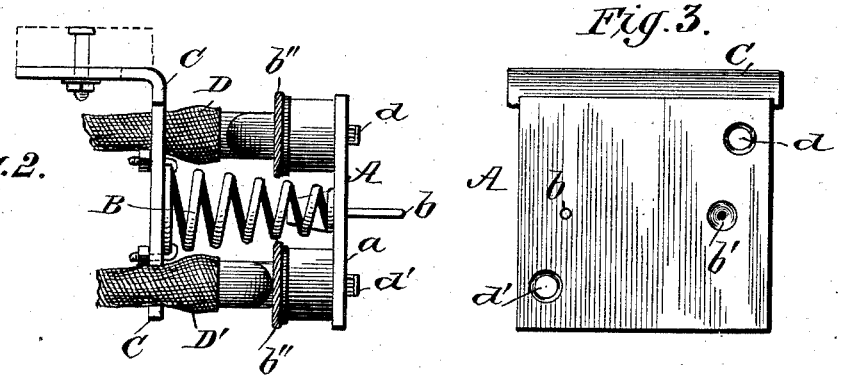
Figure 3:
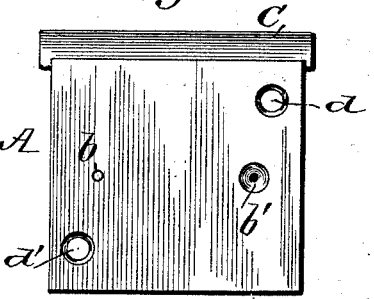
Figure 4:
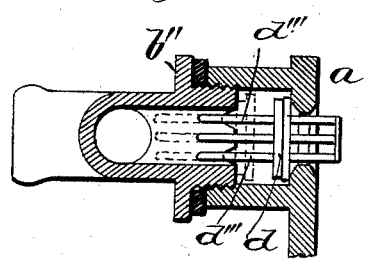
Figure 5:
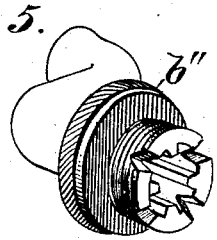
Figure 6:
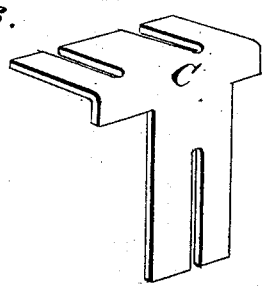

In the accompanying drawings, Figure 1 is a plan view of the coupling engaged. Fig. 2 is a side view of one-half of the coupling. Fig. 3 is a face view of one of the coupling-heads. Fig. 4 is a longitudinal section of a portion of one of the coupling-heads. Fig. 5 is a perspective view of one of the screw-threaded heads that close the rear end of a valve-chamber, and Fig. 6 is a perspective view of one of the brackets that support the coupling-heads.

The couplings proper A A, Fig. 1, one of which is attached to each end of a car, are supported in due position by means of spiral springs B, which are in turn fastened adjustably to the pendent arm of a right-angular bracket C, that is bolted to the under side of a draw-head of a car.

Each of the couplings A consists, principally, of a head containing a valve $d$ and having a flat vertical front or face, from one side of which a pin $b$ projects horizontally forward, while a pin-receiving tube or socket $b'$ projects rearward from the other side of the head. A coupling being attached to each end of a car, when such cars meet the pin of each head $a$ enters the opposite and corresponding socket $b$ of the head on the opposite car, Fig. 1. It will be noted that the socket $b'$ is tapered internally, the front end being the wider to enable the pin $b$ to readily enter the socket when the heads $a$ $a$ closely approach each other. Each head $a$ is shown provided with two like valves $d$ $d'$, Fig. 2. The upper one $d$ controls the air-passage to the train or brake pipe and the lower one $d'$ is the "whistle-valve," which controls admission of compressed air to a line of pipe with which a signaling-valve is connected in each car for use in signaling the engineer. I do not show the connections of this signaling apparatus, since it is well-known. Nor shall I make further reference to the lower valve $d'$, since it is a counterpart of the upper one $d$ in form, arrangement, and operation. It will be seen, Figs. 1 and 3, that a flexible hose D leads off from the upper valve $d$ and a similar hose D' from the lower valve $d'$. These will in practice connect, respectively, with the train or brake pipe and the pipe of the signaling apparatus, neither of which appears in the drawings. In order to provide space for attachment of the spiral spring B to a coupling-head $a$, the hose D D' are attached to laterally-divergent nipples, Fig. 1, which constitute integral portions of screw-threaded heads $b''$, that close the rear ends of the cylindrical portions of the coupling-heads $a$, wherein the valves $d$ $d'$ are contained and reciprocate. The disk-valve $d$, Fig. 4, works in a horizontal cylindrical chamber of the head $a$ and seats against the circular flange that forms the edge of the opening in the front end of said chamber. The head of the valve projects through this opening and beyond the face of the head $a$, as shown, Figs. 2 and 4. The valve $d$ has an elastic packing and is held and guided in vertical position by means of parallel arms or rods $d'''$, that project from its rear side and slide (when the valve $d$ moves either way) in the contracted bore of the threaded head $b''$, which closes the rear end of the valve-chamber and is provided with the curved nipple before described. The inner end of such head $b''$ is provided with notches, as shown in Fig. 5, for admitting air to pass the valve when the latter is seated back against the head $b''$.

It will be seen that when two cars provided with my coupling-heads $a$ $a$ approach closely the pin $b$ of one head will enter the socket $b'$ of the other, and the flat fronts or faces of said heads will then abut, as shown in Fig. 1. The draw-heads being coupled at the same time, either automatically or manually, as the case may be, the heads $a$ $a$ will be held in contact with a yielding pressure by means of the springs B B. When the heads $a$ $a$ thus meet, the valves are forced back off their seats and against the notched ends of the parts $b''$, (see dotted lines, Fig. 4,) which allows air to pass around them and through the notches of the rear seat into the hose D and connecting train-pipes. (Not shown.) On the other hand, when the coupling-heads $a$ $a$ separate, the air-pressure instantly forces the valves $d$ back to their front seats, so that further escape or leakage is prevented while the cars remain uncoupled. Thus the coupling and uncoupling of the air-pipes is effected automatically, and the presence, assistance, or attention of a train-hand is unnecessary. In the coupling operation the pins $b$ $b$ and tapering sockets $c$ $c$ serve as guides which insure the valve-heads coming in contact, as required to open the passage-way from one hose D to the other on the opposite car, and they also hold the valved openings in the coupling-heads $a$ $a$ in registration after the coupling is effected.

The spring B is of spiral form; but other forms may be employed, since the sole function of the spring is to support the heads $a$ in due position for coupling and to keep them pressed tightly together while the cars are connected, and it is obvious the springs will do this despite the contraction and widening of the space between adjacent cars, as well as their lateral oscillation while running.

Since different cars may vary in height, it will sometimes be necessary to adjust one of the two opposite coupling-heads $a$ higher or lower to bring it on the same level with the other. To this end I attach the spring B adjustably to the vertical pendent slotted arm of the right-angular bracket C, and I preferably employ screw-bolts and nuts for clamping these parts together. These bolts have hooked ends for clasping the springs and pass through vertical slots in the bracket C, the nuts being applied on their rear ends. It may also be necessary in some instances to adjust the bracket longitudinally of the car in order that the spring B may always hold the couplings $a$ $a$ slightly in advance of the car-couplings, so as to insure prior contact of the latter and due pressure between them. I therefore provide the horizontal arm of the brackets C with lengthwise slots, Figs. 1 and 2, to receive screws that secure the brackets to the draw-head. The operation whereby the brackets are adjusted is obvious.

The nipples to which the hose D D' are attached might be applied to the sides of the cylindrical or chambered portions of the head-couplings, instead of their rear ends.

Having thus described my invention, what I claim, and desire to secure by Letters Patent, is—

In a pipe-coupling for pneumatic car-brakes, the combination, with a coupling-head having valves and a bracket attached to the car-frame and a vertical slot, of the spring attached to and supporting said head and means for securing it to the slotted bracket, and also adjusting it higher or lower, as specified.

RUFUS W. TINSLEY.

Witnesses:
 JAMES MUNRO,
 HARRY M. GRIMBALL.